United States Patent
Castellanos Zamora et al.

(10) Patent No.: US 12,267,674 B2
(45) Date of Patent: Apr. 1, 2025

(54) METHOD FOR SUPPORTING AUTHENTICATION OF A USER EQUIPMENT IN AN INTERNET MULTIMEDIA SUBSYSTEM (IMS) COMMUNICATION NETWORK

(71) Applicant: Telefonaktiebolaget LM Ericsson (publ), Stockholm (SE)

(72) Inventors: David Castellanos Zamora, Madrid (ES); Jose Miguel Dopico Sanjuan, Torrelodones (ES); Miguel Angel Garcia Martin, Pozuelo de Alarcon (ES); Jesús Ángel De Gregorio Rodriguez, Madrid (ES); George Foti, Dollard Des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 283 days.

(21) Appl. No.: 17/776,017

(22) PCT Filed: Jan. 6, 2020

(86) PCT No.: PCT/EP2020/050138
§ 371 (c)(1),
(2) Date: May 11, 2022

(87) PCT Pub. No.: WO2021/093997
PCT Pub. Date: May 20, 2021

(65) Prior Publication Data
US 2022/0408251 A1 Dec. 22, 2022

(30) Foreign Application Priority Data
Nov. 15, 2019 (EP) .................................... 19383012

(51) Int. Cl.
*H04W 12/06* (2021.01)
*H04L 65/1016* (2022.01)
(Continued)

(52) U.S. Cl.
CPC ......... *H04W 12/06* (2013.01); *H04L 65/1016* (2013.01); *H04W 8/08* (2013.01); *H04W 12/72* (2021.01); *H04W 80/04* (2013.01)

(58) Field of Classification Search
CPC ..... H04W 12/06; H04W 12/08; H04W 12/72; H04W 48/08; H04W 8/08; H04W 80/04;
(Continued)

(56) References Cited

U.S. PATENT DOCUMENTS 9,370,037 B2 * 6/2016 Avula et al. ........ H04W 76/028
2008/0013533 A1 * 1/2008 Bogineni et al.
(Continued)

FOREIGN PATENT DOCUMENTS

EP 1816825 A1 * 8/2007 ............. H04L 67/02
EP 2437459 A1 * 4/2012 ............. H04L 29/06
(Continued)

OTHER PUBLICATIONS

International Search Report and Written Opinion dated Mar. 11, 2020 for International Application No. PCT/EP2020/050138 filed Jan. 6, 2020; consisting of 13 pages.
(Continued)

*Primary Examiner* — Meless N Zewdu
(74) *Attorney, Agent, or Firm* — Weisberg I.P. Law, P.A.

(57) ABSTRACT

A method for supporting authentication of a User Equipment, UE, in an Internet Protocol, IP, Multimedia Subsystem, IMS, telecommunication network, by interfacing a Service Based Architecture, SBA, telecommunication network, the method including receiving, by a Unified Data Management, UDM, in the SBA telecommunication net-
(Continued)

work, from a Session Management Function, SMF, in the SBA telecommunication network, binding information, wherein the binding information is used to identify the UE in the IMS telecommunication network; receiving, by the UDM in the SBA telecommunication network, from a Home Subscriber Server, in the IMS telecommunication network, a request for providing the binding information, and providing, by the UDM in the SBA telecommunication network, to the HSS in the IMS telecommunication network the binding information, thereby supporting authentication of the UE. Complementary methods and corresponding nodes are also presented herein.

19 Claims, 7 Drawing Sheets

(51) Int. Cl.
 *H04W 8/08* (2009.01)
 *H04W 12/72* (2021.01)
 *H04W 80/04* (2009.01)

(58) Field of Classification Search
 CPC . H04W 4/60; H04W 12/00; H04W 36/00226; H04W 36/0027; H04W 8/04; H04W 8/06; H04W 4/50; H04W 65/1006; H04W 12/40; H04W 12/48; H04W 12/10; H04W 8/18; H04W 36/00222; H04L 65/1016; H04L 65/1104; H04L 65/1073; H04L 65/1046; H04L 65/1066; H04L 65/40; G06F 21/30; G06F 21/31; G06F 21/45
 See application file for complete search history.

(56) References Cited

U.S. PATENT DOCUMENTS

| | | | |
|---|---|---|---|
| 2008/0219241 | A1 | 9/2008 | Leinonen et al. |
| 2014/0108799 | A1* | 4/2014 | Wang et al. ............... 713/168 |
| 2018/0376444 | A1* | 12/2018 | Kim et al. ............ H04W 60/04 |
| 2020/0244710 | A1* | 7/2020 | Patil et al. .......... H04L 65/1016 |
| 2021/0037375 | A1* | 2/2021 | Cakulev et al. ...... H04W 8/186 |

FOREIGN PATENT DOCUMENTS

| | | | |
|---|---|---|---|
| WO | 2018202284 A1 | 11/2018 | |
| WO | WO 2018204609 A1 * | 11/2018 | ............ H04W 48/16 |
| WO | WO 2019204199 A1 * | 10/2019 | ............ H04L 29/06 |

OTHER PUBLICATIONS

3GPP TS 33.203 V15.1.0; 3rd Generation Partnership Project; Technical Specification Group Services and System Aspects; 3G security; Access security for IP-based services (Release 15); Mar. 2018; consisting of 145 pages.
3GPP TS23.501 V16.2.0; 3rd Generation Partnership Project; Technical Specification Group Services and System Aspects; System Architecture for the 5G System (5GS); Stage 2 (Release 16); Sep. 2019; consisting of 391 pages.
3GPP TS23.502 V16.2.0; 3rd Generation Partnership Project; Technical Specification Group Services and System Aspects; Procedures for the 5G System (5GS); Stage 2 (Release 16); Sep. 2019; consisting of 525 pages.
3GPP TS23.632 V0.4.0; 3rd Generation Partnership Project; Technical Specification Group Core Network and Terminals; User Data Interworking, Coexistence and Migration; Stage 2; (Release 16); Sep. 2019; consisting of 34 pages.
3GPP TS29.503 V16.1.0; 3rd Generation Partnership Project; Technical Specification Group Core Network and Terminals; 5G System; Unified Data Management Services; Stage 3 (Release 16); Sep. 2019; consisting of 234 pages.
3GPP TS 29.328 V15.7.0; 3rd Generation Partnership Project; Technical Specification Group Core Network and Terminals; IP Multimedia (IM) Subsystem Sh interface; Signalling flows and message contents (Release 15) Sep. 2019; consisting of 79 pages.
SA WG2 Meeting #S2-136 S2-1911718 (revision of S2-19xxxxx); Title: Support of IMS emergency sessions for roaming users in 5GS deployments without IMS-level roaming interfaces; Source to WG: Intel; Source to TSG: SA2; Date and Location: Nov. 18-22, 2019, Reno, NV, US; consisting of 7 pages.
SA WG2 Meeting #S2-136 S2-1911613 (revision of S2-19xxxxx); Title: Solution for IMS voice and emergency services support in SNPN; Source: Intel; Document for: Discussion/Approval; Agenda Item: 8.3; Work Item/Release: FS_eNPN/Rel-17; Date and Location: Nov. 18-22, 2019, Reno, NV, US; consisting of 3 pages.

* cited by examiner

METHOD FOR SUPPORTING AUTHENTICATION OF A USER EQUIPMENT IN AN INTERNET MULTIMEDIA SUBSYSTEM (IMS) COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2020/050138, filed Jan. 6, 2020 entitled "A METHOD FOR SUPPORTING AUTHENTICATION OF A USER EQUIPMENT," which claims priority to European Application No.: EP19383012.2, filed Nov. 15, 2019, the entireties of both of which are incorporated herein by reference.

TECHNICAL FIELD

The present disclosure mainly relates to the field of telecommunication and more specifically to methods for supporting authentication of a User Equipment, UE, in a telecommunication network.

BACKGROUND

The Third Generation Partnership Project, 3GPP, Technical Standard, TS, 33.203 specifies the security features and mechanisms for secure access to the Internet Protocol, IP, Multimedia Subsystem, IMS, when used over 3GPP accesses. The security features in IMS are based on user authentication based on identifiers and credentials stored in an IMS Subscriber Identity Module, ISIM, application in the Universal Integrated Circuit Card, UICC. However, IMS also allows the usage of the identifiers and credentials stored in the Universal Mobile Telecommunications System, UMTS, Subscriber Identity Module, USIM, application in the UICC which are primarily used for 3GPP access authentication, such as General Packet Radio Service, GPRS, and Evolved Packet Core, EPC, for authentication at IMS level.

Additionally, 3GPP TS 33.203 Annex T also specifies an interim security solution for early IMS implementations that are not fully compliant with the IMS security architecture; the so called GPRS IMS Bundled Authentication, GIBA. Although the GIBA security solution was initially conceived as an interim step for facilitating early IMS deployments over 3GPP accesses, it has proved to offer enough security for most 3GPP deployments of IMS. As such, it has gained traction and can no longer be considered an interim solution for early deployments, but just, a main stream IMS security mechanism.

GIBA is an authentication mechanism which is an interim solution for devices which are not fully compliant with IMS Authentication and Key Agreement, AKA. A user's IP address which has been allocated when they establish a Packet Data Protocol, PDP, Context is passed to the Home Subscriber Server, HSS, and linked to their private/public ID. Future requests to the IMS must come from the same IP address in order.

3GPP AKA is one of the authentication mechanisms currently defined in IMS, which makes use of the general 3GPP AKA mechanism that is also used within third generation CS and GPRS networks. 3GPP AKA relies on a shared secret between the user stored in the UICC card and the network Stored in the HSS and is performed automatically without any user interaction.

GIBA, formerly called early IMS security, which is deployed within 3GPP based networks which does not provide as yet the infrastructure for full IMS security, e.g. networks with early IMS deployments that did not make used of IPsec and 3GPP AKA for IMS. GIBA relies on the security of the GPRS layer and therefore no specific IMS or SIP authentication procedures are required.

This GIBA security solution was in principle expected to be used before products, mainly User Equipments, UEs, are available which fully support the 3GPP IMS security features defined in the main body of TS 33.203. Therefore, there is a need to ensure that simple, yet adequately secure, mechanisms are in place to protect against the most significant security threats that will exist in early IMS implementations.

The GIBA security solution works by creating a secure binding in the HSS between the public/private user identity, i.e. the Session Initiation Protocol, SIP-level identity and the Internet Protocol, IP, address currently allocated to the user at the GPRS access level such as bearer/network level identity. Therefore, IMS level signalling, and especially the IMS identities claimed by a user, can be bound together securely to the Packet Switched, PS, domain bearer level security context. The signalling flow for the use of GIBA for Gm is shown in FIG. 1.

FIG. 1 is described in further detail subsequently in the present disclosure.

Although GIBA was designed to be used mainly with GPRS access, it can be also used in EPC with a Packet Data Network Gateway, PDN-GW, acting as RADIUS Client and supporting Gi interactions with HSS acting as RADIUS Server.

GIBA can be also used for authenticating user access to IMS Application Servers as an alternative to GAA/GBA. In this case, an IMS-Application Server, IMS-AS, requests binding information to HSS via Sh UDR Diameter command for IP address secure binding information as defined in 3GPP TS 29.328. GIBA support in 5GC has not been specified so far.

3GPP Rel16 TS 23.501 defines architecture and solutions to enable support for Non-Public Networks, NPNs, in Fifth Generation Core, 5GC. An NPN is a 5GS deployed for non-public use. An NPN may be deployed as a Stand-alone Non-Public Network, SNPN, i.e. operated by an NPN operator and not relying on network functions provided by a Public Land Mobile Network, PLMN.

Some PLMN operators are trying still to enable services and capabilities offered by the PLMN to the SNPN. In particular, IMS based voice/video/messaging capabilities are in focus.

In SNPN deployments it is expected that the UEs are not going to be using authentication mechanisms based on using International Mobile Subscriber Identity, IMSI and AKA mechanism, primarily because UEs may not even be able to host a UICC. Identity and authentication management is likely to be based on alternative identifiers and credentials, such as Subscription Permanent Identifiers, SUPIs, in Network Access Identifier, NAI, format and certificate-based authentication using Extensible Authentication Protocol-Transport Layer Security, EAP-TLS.

Therefore, the support for the IMS security solution defined in 33.203 in UEs used in SNPN may not be in place either, so alternative authentication mechanisms to enable IMS services to SNPN UEs should be used.

Another popular authentication mechanism in IMS is SIP Digest authentication based on Hyper-Text Transfer Protocol, HTTP, digest authentication, using a username and a password as credentials. But that requires that SNPN UEs are configured with PLMN credentials.

An authentication solution to enable IMS services to SNPN UEs which minimizes the configuration of SNPN UEs is desirable.

SUMMARY

In a first aspect of the present disclosure, there is presented a method for supporting authentication of a User Equipment, UE, in an Internet Protocol, IP, Multimedia Subsystem, IMS, telecommunication network, by interfacing a Service Based Architecture, SBA, telecommunication network. The method comprises the steps of receiving, by a Unified Data Management, UDM, in said SBA telecommunication network, from a Session Management Function, SMF, in said SBA telecommunication network, binding information, wherein said binding information is used to identify said UE in said IMS telecommunication network, receiving, by said UDM in said SBA telecommunication network, from a Home Subscriber Server, in said IMS telecommunication network, a request for providing said binding information, and providing, by said UDM in said SBA telecommunication network, to said HSS in said IMS telecommunication network said binding information, thereby supporting authentication of said UE.

The inventors have found that it may be beneficial if the UDM receives binding information like the IP address or the Subscription Permanent Identifier/Globally Unique Personal Identifier, for example from a Session Management Function, SMF, and that the Home Subscriber Server, HSS, is able to retrieve the binding information from the UDM during authentication of the UE in the IMS domain.

The binding information may, for example, be provided to the UDM during an authentication process of the UE in the Service Based Architecture, SBA, network. During such an authentication process, the SMF registers a corresponding PDU session in the UDM. As such, the inventors have found that it may be beneficial to introduce the binding information in the message exchanged from the SMF to the UDM.

In accordance with the present disclosure, the IP Multimedia Subsystem, IMS, is a concept for an integrated network of telecommunications carriers that would facilitate the use of IP for packet communications in all known forms over wireless or landline. Examples of such communications include traditional telephony, fax, e-mail, Internet access, Web services, Voice over IP, VoIP, instant messaging, IM, videoconference sessions and video on demand, VoD. IMS is part of the Third Generation Partnership Project, 3GPP.

An SBA telecommunication network may be a Fifth Generation, 5G, network. The present disclosure provides a mechanism to support an authentication mechanism in 5G Core, 5GC, for devices that may not be able to host a Universal Integrated Circuit Card, UICC or may not be able to use International Mobile Subscriber Identity, IMSI, based security mechanisms. The present disclosure enables a simple, but yet secured, authentication mechanism for access to the IMS domain to those UEs.

The Session Management Function, SMF, may be an element of the 5G Service-Based Architecture. The SMF may primarily be responsible for interacting with the decoupled data plane, creating updating and removing Protocol Data Unit, PDU, sessions and managing session context with the User Plane Function, UPF.

The SMF may be involved in a PDU session establishment request originating from the UE, wherein the UE requests registration, and authentication, of the UE in the SBA, i.e. 5GC, telecommunication network.

According to an embodiment, the binding information is provided over a service operation of the Nudm service. For example, the information is provided over the existing service operation Nudm_UEContextManagement_Registration. The UDM may also provide the binding information via an Nudm_SDM_getservice. This service operation is provided over the standardized Nudm interface. In order to make use of an existing service operation, the service operation may have to be extended to comprise additional information. Such a modification is presented in this disclosure.

According to an exemplary embodiment, the binding information comprises at least:
UE IP address
a timestamp of a Protocol Data Unit, PDU, session registration.

When the binding information includes a timestamp, this can be used to select said binding information to be provided to said HSS. The inventors considered it advantageous that the timestamp may be of assistance for the UDM to determine the most recent SMF for the DNN in case UDM keeps stalling information regarding old SMFs.

According to an embodiment, the method further comprises the step of providing, by said UDM, to said SMF, information regarding the Data Network Names, DNNs, that will require reporting of the UE IP address to said UDM.

According to an example, said step of receiving said binding information comprises:
requesting, by said UDM, from said SMF, said binding information triggered by said receiving, from said HSS, said request for providing said binding information, and
receiving, by said UDM, said binding information from said SMF.

According to another example, the binding information comprises a timestamp indicting a time when said binding information was generated.

The above described two examples are best explained with respect to FIG. 10 which is explained in more detail later in this particular disclosure.

In a second aspect of the present disclosure, there is presented a method for supporting authentication of, or actually authenticating, a User Equipment, UE, in an Internet Protocol, IP, Multimedia Subsystem, IMS, telecommunication network, by interfacing a Service Based Architecture, SBA, telecommunication network. The method according to the second aspect comprises the steps of sending, by a Home Subscriber server, HSS, in said IMS telecommunication network, to a Unified Data Management, UDM, in said SBA telecommunication network, a request for providing binding information, wherein said binding information is used to identify said UE in said IMS telecommunication network, receiving, by said HSS in said IMS telecommunication network, from said UDM in said SBA telecommunication network, said requested binding information, and sending, by said HSS in said IMS telecommunication network, to a Service Call/Session Control Function, S-CSCF, in said IMS telecommunication network, said binding information, thereby supporting authentication of said UE. The last step of sending could be either be replaced by or appended with the step of authenticating by said HSS node in said IMS telecommunication network, said UE based on said received binding information.

It is hereby submitted that the advantages and features associated with the first aspect of the present disclosure also relate, mutatis mutandis, to the second aspect of the present disclosure.

According to an example, the binding information is received over a service operation of the Nudm service.

In an example of the second aspect, the binding information comprises at least:
UE IP address
a timestamp of a Protocol Data Unit, PDU, session registration.

According to third aspect of the present disclosure, there is presented a method for supporting authentication of a User Equipment, UE, in an Internet Protocol, IP, Multimedia Subsystem, IMS, telecommunication network, by interfacing a Service Based Architecture, SBA, telecommunication network. This method comprises the steps of receiving, by a Session Management Function, SMF, from a Unified Data Management, UDM, a message requesting binding information for Data Network Names, DNNs, sending, by said SMF, to said UDM, binding information for the DNNs requested by said UDM.

It is hereby submitted that the advantages and features associated with the first aspect of the present disclosure also relate, mutatis mutandis, to the third aspect of the present disclosure.

In an example of the third aspect, the binding information comprises at least:
UE IP address
a timestamp of a Protocol Data Unit, PDU, session registration.

According to a fourth aspect of the present disclosure, there is presented a Unified Data Management, UDM, node in a Service Based Architecture, SBA, telecommunication network, arranged for supporting authentication of a User Equipment, UE, in an Internet Protocol, IP, Multimedia Subsystem, IMS, telecommunication network, by interfacing said SBA telecommunication network. The UDM node comprises receive equipment arranged for receiving, from a Session Management Function, SMF, in said SBA telecommunication network, binding information, wherein said binding information is used to identify said UE in said IMS telecommunication network, wherein said receive equipment is further arranged for receiving, from a Home Subscriber Server, in said IMS telecommunication network, a request for providing said binding information, and transmit equipment arranged for providing, to said HSS in said IMS telecommunication network said binding information.

The features and advantages associated with the first aspect of the present disclosure, being a method for supporting authentication of a User Equipment, is also associated with the fourth aspect, being the UDM node that supports the authentication of the UE.

According to an embodiment the binding information is arranged to be provided over an operation of the Nudm service, such as the Nudm_UECM_Registration or the Nudm_SDM_getservice.

According to an exemplary embodiment, the binding information comprises at least:
UE IP address
a timestamp of a Protocol Data Unit, PDU, session registration.

According to an embodiment, the UDM further comprises select equipment arranged to select binding information to be provided to said HSS based on said timestamp.

In an embodiment, the transmit equipment of the UDM is further arranged for providing, to said SMF, information regarding the Data Network Names, DNNs, that will require reporting of the UE IP address to said UDM.

In a further example, the transmit equipment is further arranged for requesting, from said SMF, said binding information triggered by said receiving, from said HSS, said request for providing said binding information, and wherein said receive equipment is further arranged for receiving, by said UDM, said binding information from said SMF.

Here, the binding information may comprise a timestamp indicting a time when said binding information was generated The above described example may be best explained in relation to FIG. 10, which is elucidated in more detail later in this particular disclosure.

In a fifth aspect of the present disclosure, there is presented, a Home Subscriber Server, HSS, node in an in an Internet Protocol, IP, Multimedia Subsystem, IMS, telecommunication network, arranged for supporting authentication of a User Equipment, UE, in said IMS telecommunication network, by interfacing a Service Based Architecture, SBA, telecommunication network. The HSS node comprises transmit equipment arranged for sending, to a Unified Data Management, UDM, in said SBA telecommunication network, a request for providing binding information, wherein said binding information is used to identify said UE in said IMS telecommunication network, and receive equipment arranged for receiving, from said UDM in said SBA telecommunication network, said requested binding information.

In a sixth aspect of the present disclosure, there is presented a Session Management Function, SMF, node in a Service Based Architecture, SBA, telecommunication network, arranged for supporting authentication of a User Equipment, UE, in an Internet Protocol, IP, Multimedia Subsystem, IMS, telecommunication network, by interfacing said SBA telecommunication network. The SMF node comprises receive equipment arranged for receiving, from a Unified Data Management, UDM, a message requesting binding information for Data Network Names, DNNs and transmit equipment arranged for sending, by said SMF, to said UDM, binding information for the DNNs requested by said UDM.

In a seventh aspect of the present disclosure, there is presented a computer readable storage medium comprising instructions which when loaded on to one or more nodes in a communication network is arranged for performing any of the methods according to the present disclosure. The skilled person understands that a computer program product for performing a method according to the first aspect of the present disclosure may be loaded onto and executed by a UDM node. Similarly, a computer program product for performing a method according to the second aspect of the present disclosure may be loaded onto and executed by an HSS node. Finally, a computer program product for performing a method according to the third aspect of the present disclosure may be loaded onto and executed by a SMF node.

Within the scope of the present disclosure, the steps performed by a User Data Management, UDM, node may be performed by any other Data Management node in the telecommunication network. The steps performed by a Session Management Function, SMF, may be performed by any other node in the telecommunication network that is designed to manage sessions.

The above mentioned and other features and advantages of the disclosure will be best understood from the following description referring to the attached drawings. In the drawings, like reference numerals denote identical parts or parts performing an identical or comparable function or operation.

BRIEF DESCRIPTION OF THE DRAWINGS

FIG. 3 schematically illustrates a signalling sequence for supporting 5GIBA for UE authentication in an IMS-Application Server, IMS-AS.

DETAILED DESCRIPTION

Figure 1:
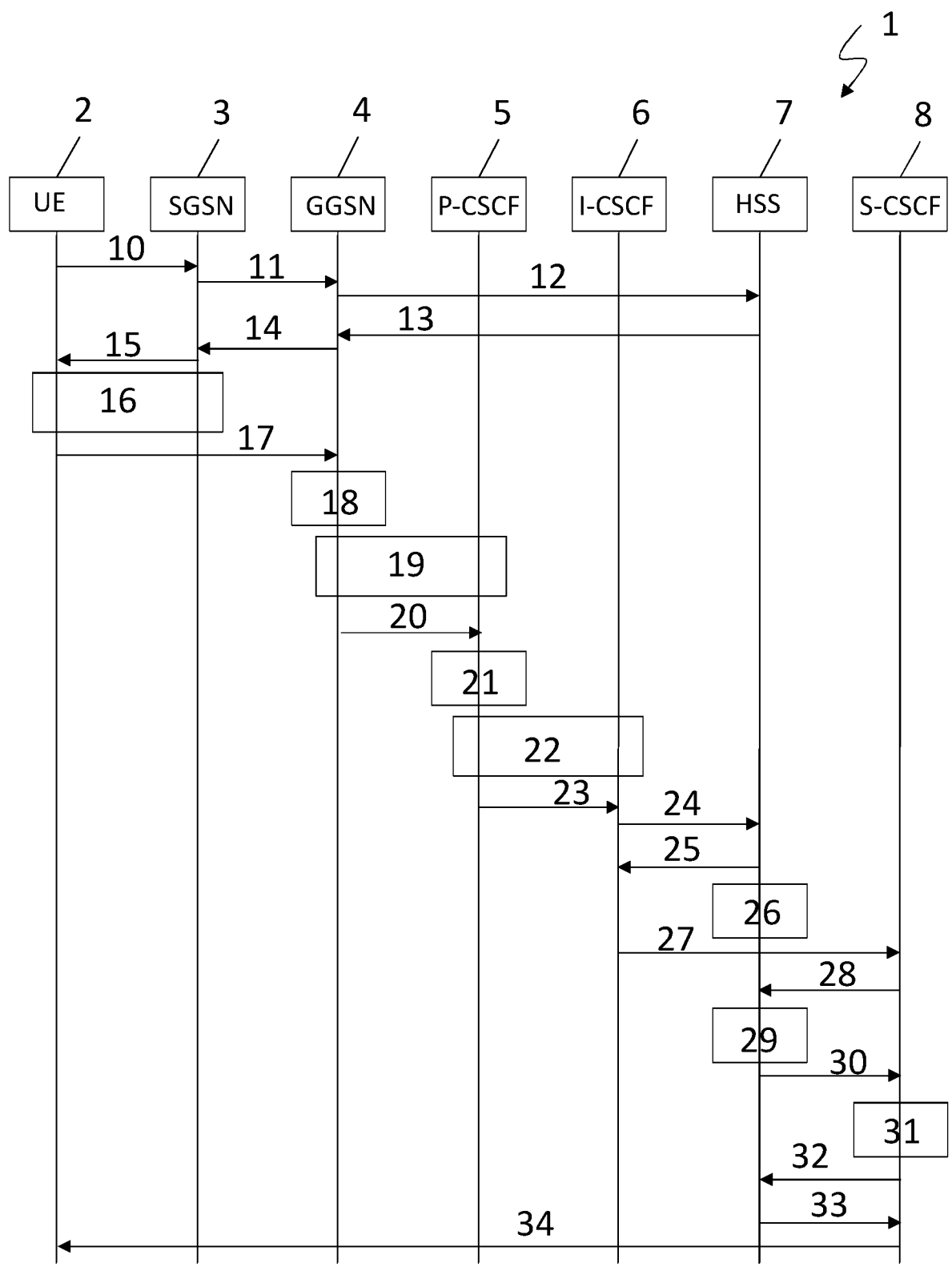
FIG. 1 schematically illustrates a message sequence for early Internet Protocol Multimedia Subsystem, IMS, security according to prior art.

Some of the examples contemplated herein will now be described more fully with reference to the accompanying drawings. Other examples, however, are contained within the scope of the subject matter disclosed herein, the disclosed subject matter should not be construed as limited to only the examples set forth herein; rather, these examples are provided by way of example to convey the scope of the subject matter to those skilled in the art.

Some possible steps of the GIBA procedure in the context of the present disclosure are highlighted below:

The UE 2 starts by setting up a PDP context as shown in steps 10-15. The GPRS Gateway Support Node, GGSN, 4 acting as a RADIUS Client provides the user's IP address assigned to the UE 2, IMSI and MSISDN to a RADIUS server in the HSS 7 over the Gi interface when a Packet Data Protocol, PDP, context is activated towards the IP Multimedia Subsystem, IMS.

When a PDP context has been successfully set up, the UE 2 sends a Session Initiation Protocol, SIP, REGISTER request 16, 17. The REGISTER request contains the IP address allocated to this UE 2 and its IMS Public Identifier, IMPU, of the UE 2.

The GGSN 4 verifies 18 that the IP address provided in the REGISTER request matches the IP address allocated to the UE 2 when the PDP context was set up. When the IP address has been verified, the GGSN 4 forwards 19, 20 the REGISTER request to the Proxy Call Session Control Function, P-CSCF, 5.

The P-CSCF 5 verifies 21 the source IP address against the IP address in the Via header of the REGISTER request. If the source IP address differs from the IP address in the Via header, the P-CSCF 5 adds the source IP address to a received parameter in the Via header. The P-CSCF 5 then forwards 22, 23 the REGISTER request to the Interrogating CSCF, I-CSCF, 6 in the home network.

The I-CSCF 6 contacts 24 the HSS 7 to authorize access to the IMS to this UE 2. The HSS 7 responds 25 that the UE 2 is authorized, and the I-CSCF 6 forwards 27 the SIP REGISTER request to the Serving CSCF, S-CSCF, 8 chosen to serve the UE 2.

The S-CSCF 8 contacts 28 the HSS 7 and indicates that GIBA is used to authenticate the UE. The HSS 7 returns 30 the stored IP address to the S-CSCF 8. The S-CSCF 8 then verifies 31 if the IP address returned by the HSS 7 matches the IP address obtained in the REGISTER request. If present, the received by parameter shall be used. If there is a match, the user is authenticated and authorized to register in IMS.

The S-CSCF 8 sends a message 32 to the HSS 7, informing that this S-CSCF 8 is going to serve the UE 2, and the HSS 7 responds 33 with a message providing information that the S-CSCF 8 needs for serving the UE 2.

The S-CSCF 8 returns 34 a SIP 200 OK response to the UE 2, indicating that the registration is successfully completed.

An authentication mechanism for enabling access to the IMS domain to UEs which do not support AKA-based identifiers and credentials when using 5GC access based on principles used in GIBA; hereinafter referred to as 5G IMS Bundled Authentication, 5GIBA.

An idea of the present disclosure gravitates around the SMF providing the UDM with binding information such as IP address, SUPI/GPSI over the existing Nudm_UEContextManagement_Registration service operation and for the HSS retrieving binding information from UDM during authentication of IMS registrations.

For registering the binding information in 5GC, an extension to the existing Nudm_UEContextManagement_Registration service operation over the standardized Nudm interface as defined in 3GPP TS 29.503. Therefore, the information that the SMF registers in UDM is extended with the UE IP Address and the SMF registration timestamp within the UE context in SMF data as follows

| UE context in SMF data | |
|---|---|
| SUPI | Key |
| PDU Session Id(s) | List of PDU Session Id(s) for the UE |
| | For emergency PDU Session Id: |
| Emergency Information | The PGW-C + SMF FQDN for emergency session used for interworking with EPC. |
| | For each non-emergency PDU Session Id: |
| DNN | DNN for the PDU Session. |
| SMF | Allocated SMF for the PDU Session. Includes SMF IP Address and SMF NF Id. |
| PGW-C + SMF FQDN | The S5/S8 PGW-C + SMF FQDN used for interworking with EPS (see NOTE 5). |
| UE IP address | Indicates the IP address assigned to the UE for the DNN. |
| SMF registration timestamp | Indicates the time of the SMF registration in UDM |

This invention proposes that the UE context in SMF is also possible to be requested filtering by SUPI/DNN as follows.

| Subscription Data Types | Data Key | Data Sub Key |
|---|---|---|
| Access and Mobility Subscription data | SUPI | — |
| SMF Selection Subscription data | SUPI | — |
| UE context in SMF data | SUPI | S-NSSAI or DNN |

Figure 2:
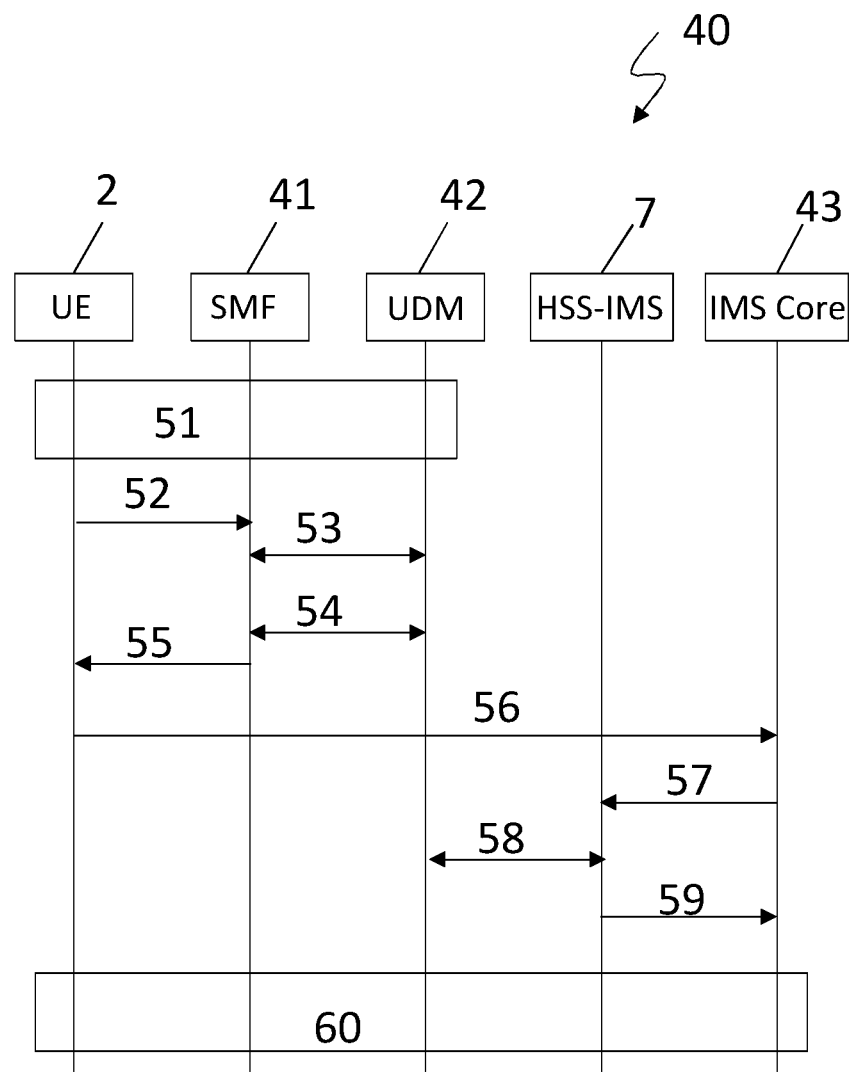
FIG. 2 schematically illustrates a signalling sequence for General Packet Radio Service, GPRS IMS Bundled Authentication, GIBA, support in a Fifth Generation Core, 5GC, Network.

FIG. 2 schematically illustrates a signalling sequence 40 for General Packet Radio Service, GPRS IMS Bundled Authentication, GIBA, support in a Fifth Generation Core, 5GC, Network.

The UE 2 authenticates and registers 51 in 5GC. Such an authentication process is known in the prior art. The SUPI and credentials used by the UE 2 may not be based on International Mobile Subscriber Identity/Authentication and Key Agreement, IMSI/AKA.

In step 52 the UE 2 establishes a PDU session for the Data Network Name, DNN, IMS. An SMF 41 suitable to establish PDU sessions for the DNN IMS is selected.

In steps 53, 54, The SMF 41 registers the PDU session in UDM 42 using the existing Nudm_UEContextManagement_Registration service operation as defined in 3GPP TS 23.502 and 3GPP TS 29.503. The SMF 41 includes the IP address assigned to the UE 2 and that the UDM 42 stores it as "UE Context in SMF data". Additionally, the SMF 41 may include a timestamp for the PDU session registration. This timestamp can be of assistance for the UDM 42 to determine the most recent SMF 41 for the DNN in case UDM 42 keeps stall information regarding old SMFs.

The SMF 41 may be configured to include the UE IP address only for the IMS DNN or do that for all DNNs. In another embodiment the UDM 42 may inform the SMF 41 about which DNNs will require reporting of the UE IP Address to UDM when the SMF requests subscription data for the SUPI/DNN to the UDM using Nudm_SDM_Get as depicted in step 53 of FIG. 2.

The PDU session establishment for the DNN IMS is completed in step 55. In subsequent step 56, the UE 2 sends the SIP REGISTER request to IMS. The SIP REGISTER request includes the UE's IMPI/IMPU and the IP address allocated to the UE 2 in 5GC. The IMPI/IMPU used by the UE 2 to register in IMS are based on the UE's SUPI used to register in 5GC. Note that the SUPI may contain a NAI used as an IMPI.

In step 57, The S-CSCF in the IMS Core 43 contacts the HSS 7 and indicates that GIBA is used to authenticate the UE 2. The HSS 7 may try to find 58 Binding information provided by GGSN/PDN-GW to the HSS using Gi. In the absence of Binding information from GPRS/EPS domain or in additionally, the HSS-IMS 7 checks binding information from 5GC as well.

In the context of UDICOM defined by 3GPP in TS 23.632 and where the HSS and the UDM are deployed as separate NFs, the HSS-IMS requests binding information (i.e. "UE context in SMF data" for the SUPI and IMS DNN) from UDM using the existing Nudm_SDM_Get service operation.

The HSS 7 creates a SUPI based on the IMPI received in the Authentication request from the S-CSCF in step 7. The UDM 42 provides the "UE context in SMF data" to the HSS 7.

In another embodiment, in the presence of multiple SMFs managing the DNN IMS, UDM may use the timestamps included in the "UE context in SMF data" to select the latest binding information from 5GC domain to be provided to the HSS.

In step 59, The HSS 7 returns the stored IP address to the S-CSCF 43. In the presence of Binding information from 5GC and GPRS/EPC domains, the HSS 7 decides which IP address to provide to the S-CSCF, for example also based on timestamps of binding information from GPRS/EPC. The S-CSCF 43 then matches the IP address returned by the HSS against the IP address obtained in the SIP REGISTER request.

In step 60, the IMS Registration procedure proceeds accordingly, for example, successfully if the IP address provided by the HSS is the same than the one provided by the UE to the S-CSCF in the SIP REGISTER message.

Figure 3:
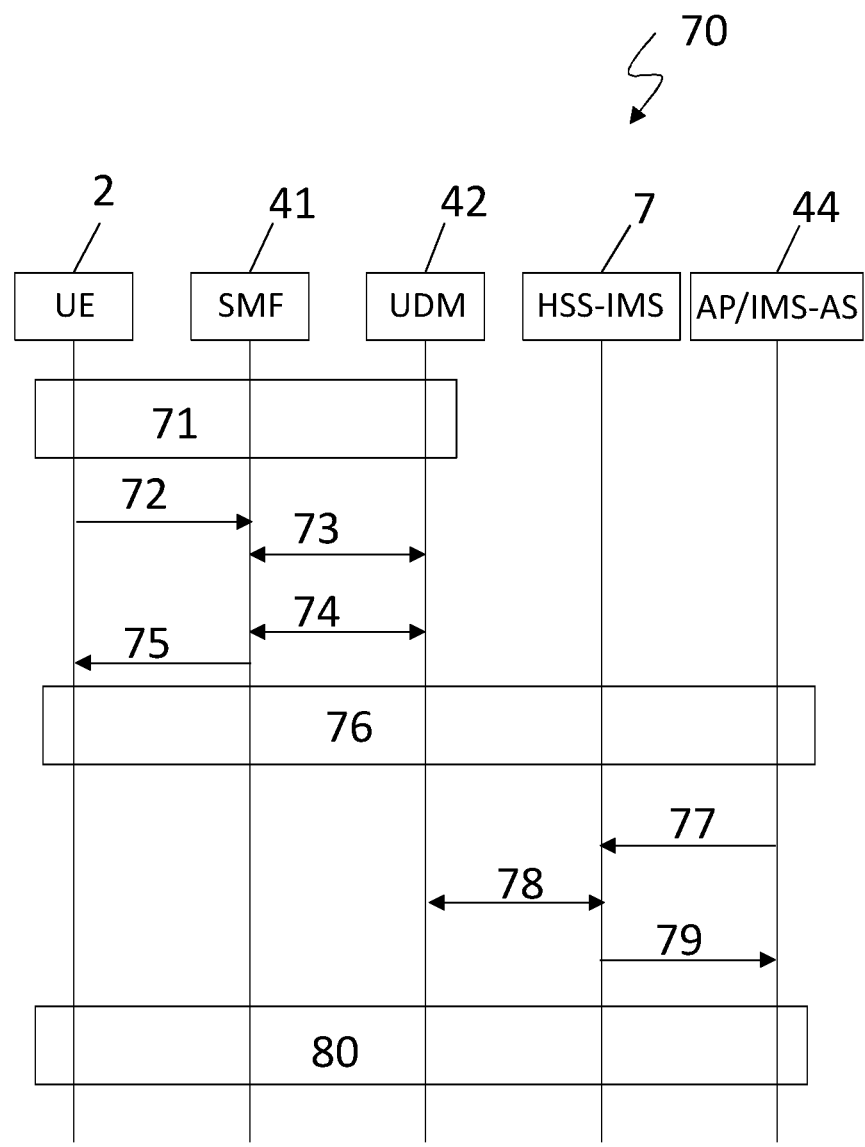

The same principles can be used for supporting 5GIBA for UE authentication in an IMS-AS as shown in the signalling diagram 70 in FIG. 3:

In this case, the secure binding information stored in UDM during UE registration in 5GC is requested in steps 73-74 by HSS 7 at reception of a request typically from an Authentication/Aggregation Proxy or an IMS AS 44 for IP Address Secure Binding Information in steps 77-79. If the Secure Binding information provided by HSS 7 is the same as the one provided by the UE in step 76, the IMS service continues or is stopped 80. The remaining steps are identical to the steps presented and described in connection with FIG. 2, i.e. step 71 in FIG. 3 corresponds to Step 51 in FIG. 2, and so on.

A mechanism to support authentication for access to the IMS domain to UEs which do not support AKA-based identifiers and credentials when using 5GC access. The proposed mechanism is based on principles used in GIBA. This will enable a simple authentication mechanism for access to the IMS domain to UEs which do not support AKA-based identifiers and credentials.

Figure 4:
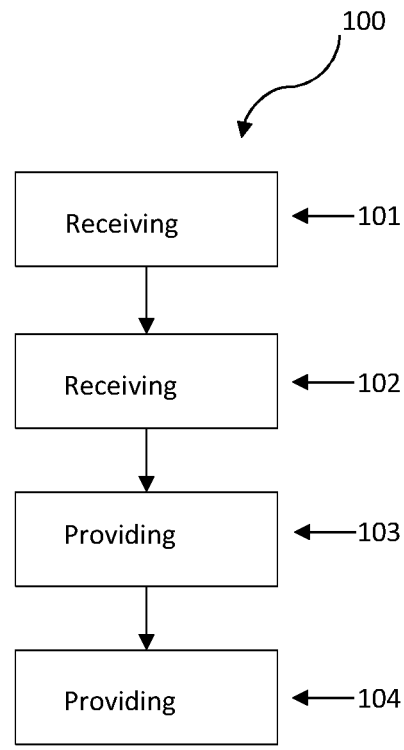
FIGS. 4-6 schematically illustrate a method according to the present disclosure.

FIG. 4 shows a method 100 for supporting authentication of a User Equipment, UE, in an Internet Protocol, IP, Multimedia Subsystem, IMS, telecommunication network, by interfacing a Service Based Architecture, SBA, telecommunication network. The method comprises the steps of receiving 101, by a Unified Data Management, UDM, in said SBA telecommunication network, from a Session Management Function, SMF, in said SBA telecommunication network, binding information, wherein said binding information is used to identify said UE in said IMS telecommunication network. In a subsequent step 102, the UDM receives from a Home Subscriber Server, in said IMS telecommunication network, a request for providing said binding information, and subsequently provides 103 to said HSS in said IMS telecommunication network said binding information, thereby supporting authentication of said UE.

The method 100 may also comprise an additional step of providing 104, by said UDM, to said SMF, information regarding the Data Network Names, DNNs, that will require reporting of the UE IP address to said UDM.

Figure 5:
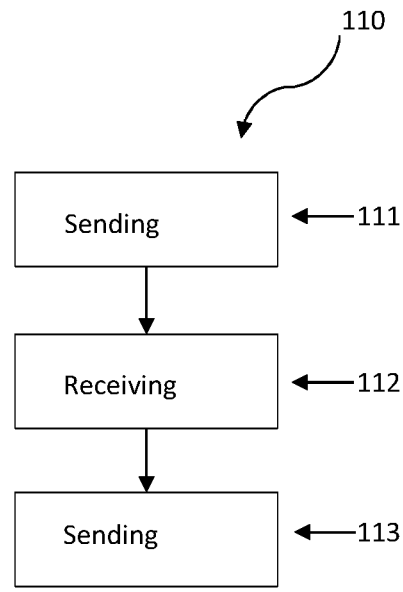

FIG. 5 illustrates a method 110 for supporting authentication of a User Equipment, UE, in an Internet Protocol, IP, Multimedia Subsystem, IMS, telecommunication network, by interfacing a Service Based Architecture, SBA, telecommunication network. The method comprises the steps of sending 111, by a Home Subscriber server, HSS, in said IMS telecommunication network, to a Unified Data Management, UDM, in said SBA telecommunication network, a request for providing binding information, wherein said binding information is used to identify said UE in said IMS telecommunication network. The HSS receives 112 from said UDM in said SBA telecommunication network, said requested binding information, and sends 113 to a Service Call/Session Control Function, S-CSCF, in said IMS telecommunication network, said binding information, thereby supporting authentication of said UE.

Figure 6:
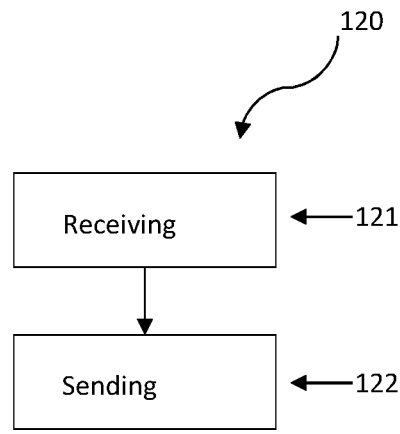

FIG. 6 schematically illustrates a method 120 for supporting authentication of a User Equipment, UE, in an Internet Protocol, IP, Multimedia Subsystem, IMS, telecommunication network, by interfacing a Service Based Architecture, SBA, telecommunication network. The method 120 comprises the steps of, receiving 121, by a Session Management Function, SMF, from a Unified Data Management, UDM, a message requesting binding information for Data Network Names, DNN, and sending 122, by said SMF, to said UDM, binding information for the DNNs requested by said UDM.

Figure 7:
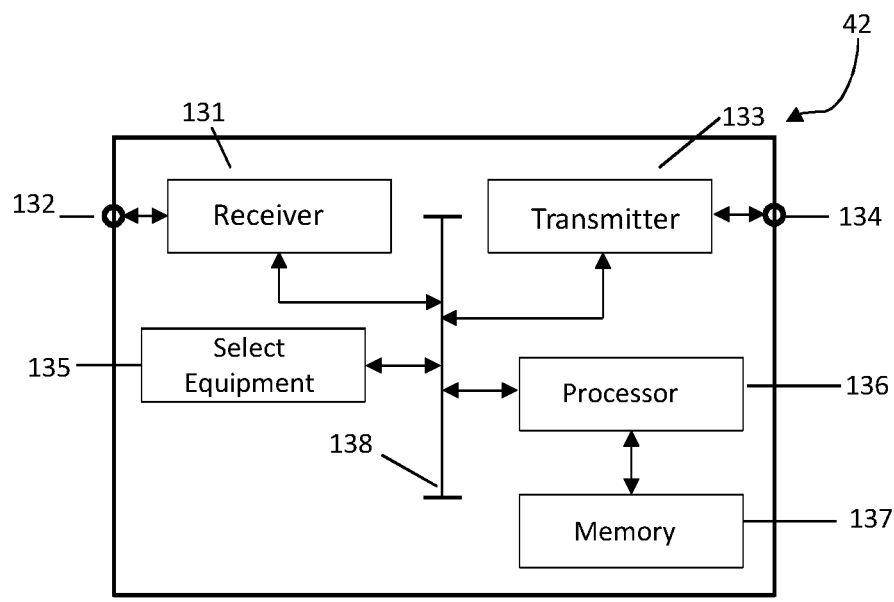
FIG. 7 schematically illustrates a Unified Data Management, UDM, according to the present disclosure.

FIG. 7 schematically illustrates a Unified Data Management, UDM, node 42 in a Service Based Architecture, SBA, telecommunication network, arranged for supporting authentication of a User Equipment, UE, in an Internet Protocol, IP, Multimedia Subsystem, IMS, telecommunication network, by interfacing said SBA telecommunication network. The UDM node 42 comprises receive equipment 131, 132 arranged for receiving, from a Session Management Function, SMF, in said SBA telecommunication network, binding information, wherein said binding information is used to identify said UE in said IMS telecommunication network. The receive equipment 131, 132 is further arranged for receiving, from a Home Subscriber Server, in said IMS telecommunication network, a request for providing said binding information.

The UDM node 42 also comprises transmit equipment 133, 134 arranged for providing, to said HSS in said IMS telecommunication network said binding information. The UDM node may also additionally comprise select equipment 135 arranged to select binding information to be provided to said HSS based on said timestamp.

The UDM node 42 also comprises memory 137 which is arranged to store a set of computer readable instructions which when executed by the processor 136 cause the UDM node 42 to perform a method according to the present disclosure. The internal components communicate with one another using the internal bus 138.

Figure 8:
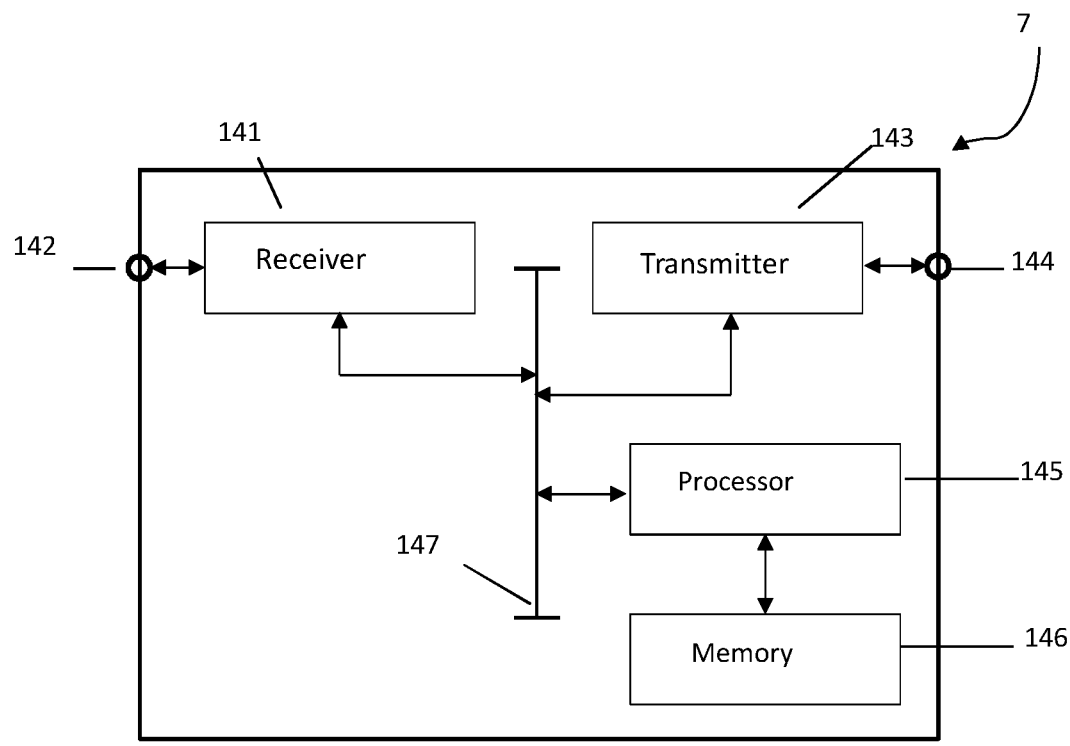
FIG. 8 schematically illustrates a Home Subscriber Server, HSS, according to the present disclosure.

FIG. 8 schematically illustrates a Home Subscriber Server, HSS, node 7 in an Internet Protocol, IP, Multimedia Subsystem, IMS, telecommunication network, arranged for supporting authentication of a User Equipment, UE, in said IMS telecommunication network, by interfacing a Service Based Architecture, SBA, telecommunication network. The HSS node 7 comprises transmit equipment 143, 144 arranged for sending, to a Unified Data Management, UDM, in said SBA telecommunication network, a request for providing binding information, wherein said binding information is used to identify said UE in said IMS telecommunication network, and receive equipment 141, 142 arranged for receiving, from said UDM in said SBA telecommunication network, said requested binding information.

The HSS node 7 also comprises memory 146 which is arranged to store a set of computer readable instructions which when executed by the processor 145 cause the HSS node to perform a method according to the present disclosure. The internal components communicate with one another using the internal bus 147.

Figure 9:
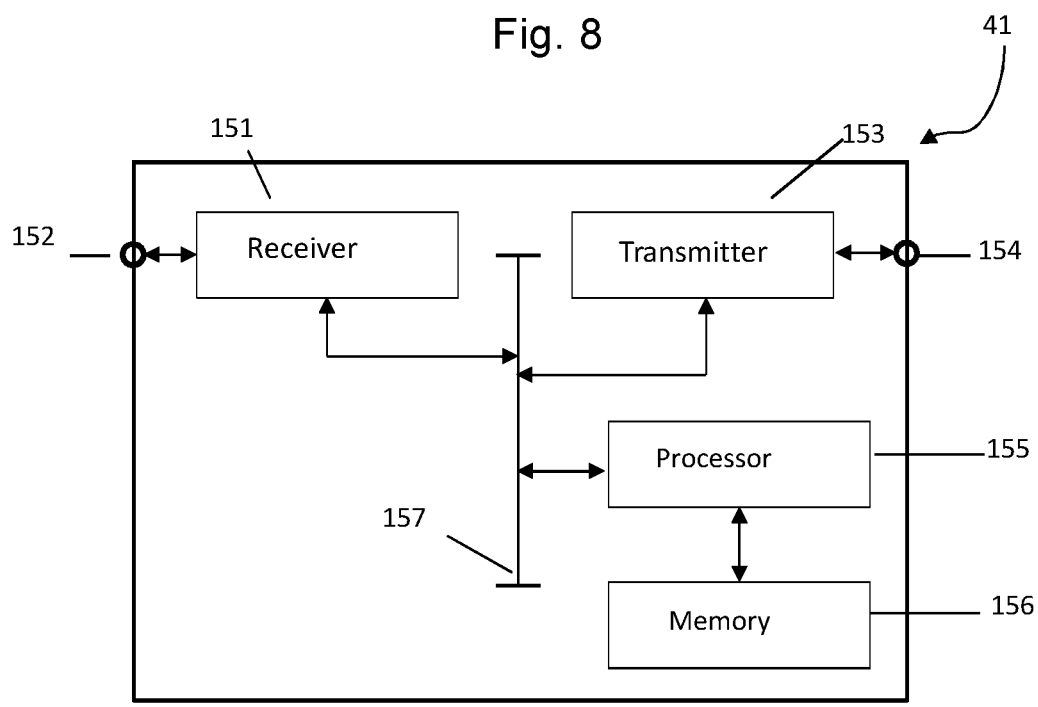
FIG. 9 schematically illustrates a Session Management Function, SMF, according to the present disclosure.

FIG. 9 schematically illustrates a Session Management Function, SMF, node 41 in a Service Based Architecture, SBA, telecommunication network, arranged for supporting authentication of a User Equipment, UE, in an Internet Protocol, IP, Multimedia Subsystem, IMS, telecommunication network, by interfacing said SBA telecommunication network. The SMF node 41 comprises receive equipment 151, 152 arranged for receiving, from a Unified Data Management, UDM, a message requesting binding information for Data Network Names, DNNs, and transmit equipment 153, 154 arranged for sending, by said SMF, to said UDM, binding information for the DNNs requested by said UDM.

Figure 10:
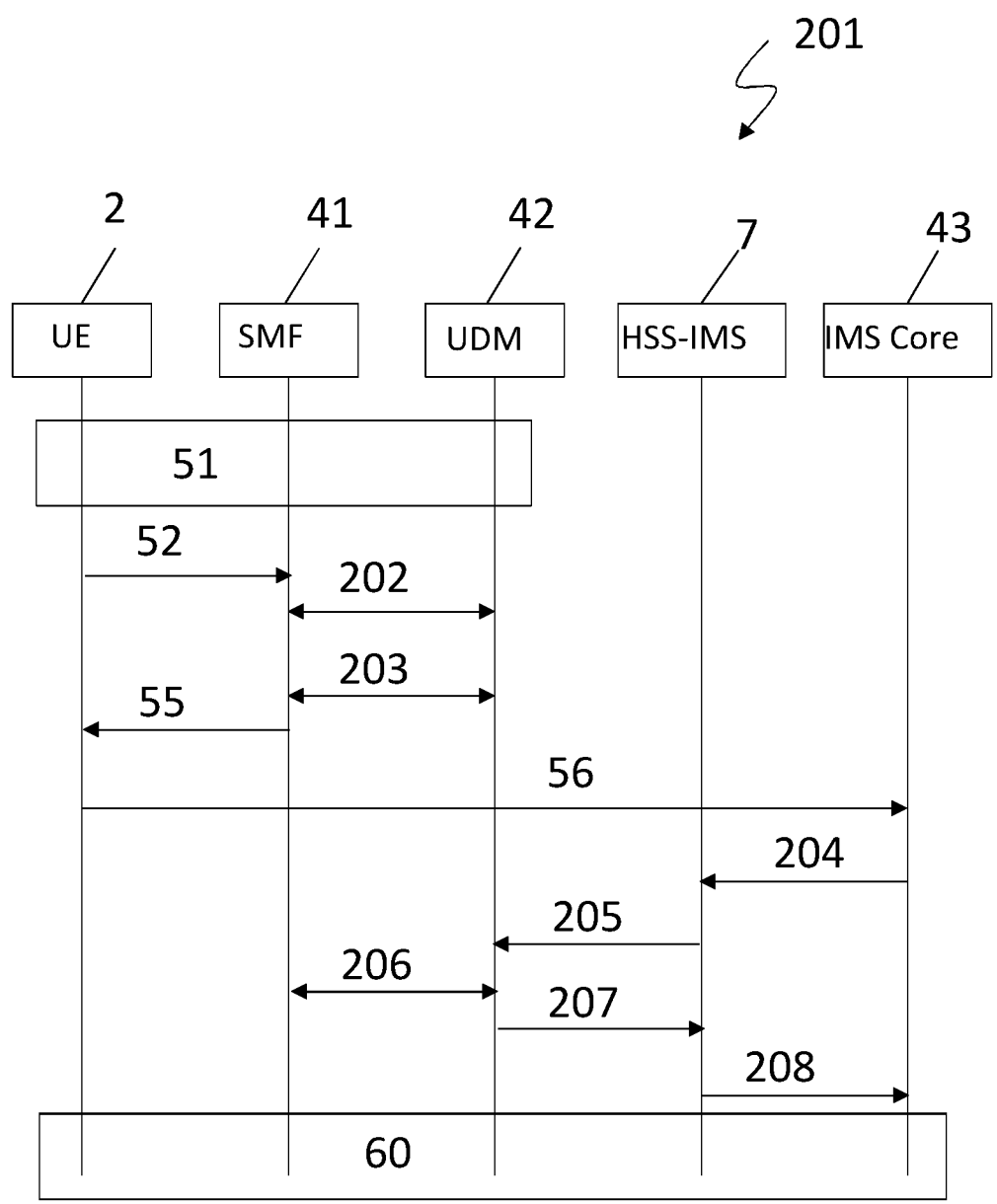
FIG. 10 schematically illustrates a method according to the present disclosure.

The SMF node 41 also comprises memory 156 which is arranged to store a set of computer readable instructions which when executed by the processor 155 cause the SMF node 41 to perform a method according to the present disclosure. The internal components communicate with one another using the internal bus 157. FIG. 10 schematically illustrates a method according to the present disclosure.

The method illustrates a signalling sequence 201 for General Packet Radio Service, GPRS IMS Bundled Authentication, GIBA, support in a Fifth Generation Core, 5GC, Network.

The UE 2 authenticates and registers 51 in 5GC, just like the situation sketched with reference to FIG. 2. In step 52 the UE 2 establishes a PDU session for the Data Network Name, DNN, IMS. An SMF 41 suitable to establish PDU sessions for the DNN IMS is selected.

In steps 202, 203, The SMF 41 registers the PDU session in UDM 42 using, for example, the existing Nudm_UEContextManagement_Registration service operation as defined in 3GPP TS 23.502 and 3GPP TS 29.503. Here, the SMF 41 does not include the IP address assigned to the UE 2 as compared to the situation described with reference to FIG. 2.

The PDU session establishment for the DNN IMS is completed in step 55. In subsequent step 56, the UE 2 sends the SIP REGISTER request to IMS. The SIP REGISTER request includes the UE's IMPI/IMPU and the IP address allocated to the UE 2 in 5GC. The IMPI/IMPU used by the UE 2 to register in IMS are based on the UE's SUPI used to register in 5GC. Note that the SUPI may contain a NAI used as an IMPI.

In step 204, The S-CSCF in the IMS Core 43 contacts the HSS 7 and indicates that GIBA is used to authenticate the UE 2. The HSS 7 may try to find Binding information provided by GGSN/PDN-GW to the HSS using Gi. In the absence of Binding information from GPRS/EPS domain or in additionally, the HSS-IMS checks binding information from 5GC as well.

In the context of UDICOM defined by 3GPP in TS 23.632 and where the HSS and the UDM are deployed as separate NFs, the HSS-IMS requests binding information (i.e. "UE context in SMF data" for the SUPI and IMS DNN) from UDM using the existing Nudm_SDM_Get service operation.

In this particular case, the HSS 7 requests 205 the UDM 42 to provide the IP address of the UE 2. This may be implemented using, for example, an event called Nudm_Event_Exposure_Notifyservice, i.e. a one time notification of UE IP address with immediate reporting.

In step 206, the UDM 42 fetches the UE IP address using, for example, the service Nsmf_EventExposure with immediate reply. The SMF 41 then provides the UE IP Address to UDM 42 in an Nsmf_Event_Exposure_Notify operation. The existing service operations offered by SMF as defined except that in the notification the SMF 41 may include the timestamp of the time when the UE IP address was generated.

In step 207, the UDM 42 returns to the HSS 7, the UE IP address together with the timestamp in a Nudm_EventExposure_Notify operation. Finally, in step 208, the HSS 7 returns the IP address to the S-CSCF 43. In the presence of Binding information from 5GC and GPRS/EPC domains, the HSS 7 decides which IP address to provide to the S-CSCF, for example also based on timestamps of binding information from GPRS/EPC. The S-CSCF 43 then matches the IP address returned by the HSS against the IP address obtained in the SIP REGISTER request.

In step 60, the IMS Registration procedure proceeds accordingly, for example, successfully if the IP address provided by the HSS is the same than the one provided by the UE to the S-CSCF in the SIP REGISTER message.

Within the scope of the present disclosure, the steps performed by a User Data Management, UDM, node may be performed by any other Data Management node in the telecommunication network. The steps performed by a Session Management Function, SMF, may be performed by any other node in the telecommunication network that is designed to manage sessions.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the internet or wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for supporting authentication of a User Equipment (UE) in an Internet Protocol (IP) Multimedia Subsystem (IMS) telecommunication network, by interfacing a Service Based Architecture (SBA) telecommunication network, the method comprising the steps of:
   receiving, by a Unified Data Management (UDM) in the SBA telecommunication network, from a Session Management Function (SMF) in the SBA telecommunication network, binding information, the binding information being used to identify the UE in the IMS telecommunication network;
   receiving, by the UDM in the SBA telecommunication network, from a Home Subscriber Server, in the IMS telecommunication network, a request for providing the binding information; and
   providing, by the UDM in the SBA telecommunication network, to a Home Subscriber server (HSS) in the IMS telecommunication network the binding information, thereby supporting authentication of the UE in the IMS telecommunication network.

2. The method according to claim 1, wherein the binding information is provided over a service operation of a N-Unified Data Management (Nudm) service.

3. The method according to claim 1, wherein the binding information comprises at least one of:
   UE IP address; and
   a timestamp of a Protocol Data Unit (PDU) session registration.

4. The method according to claim 3, wherein the UDM uses the timestamp to select the binding information to be provided to the HSS.

5. The method according to claim 1, further comprising the step of:
   providing, by the UDM, to the SMF, information regarding Data Network Names (DNNs) that will require reporting of a UE IP address to the UDM.

6. The method according to claim 1, wherein the step of receiving the binding information comprises:
   requesting, by the UDM, from the SMF, the binding information triggered by the receiving, from the HSS, the request for providing the binding information; and
   receiving, by the UDM, the binding information from the SMF.

7. The method according to claim 6, wherein the binding information comprises a timestamp indicting a time when the binding information was generated.

8. A method for supporting authentication of a User Equipment (UE) in an Internet Protocol (IP) Multimedia Subsystem (IMS) telecommunication network, by interfacing a Service Based Architecture (SBA) telecommunication network, the method comprising the steps of:
   sending, by a Home Subscriber server (HSS) in the IMS telecommunication network, to a Unified Data Management (UDM) in the SBA telecommunication network, a request for providing binding information, the binding information being used to identify the UE in the IMS telecommunication network;
   receiving, by the HSS in the IMS telecommunication network, from the UDM in the SBA telecommunication network, the requested binding information; and
   sending, by the HSS in the IMS telecommunication network, to a Service Call/Session Control Function (S-CSCF) in the IMS telecommunication network, the binding information, thereby supporting authentication of the UE.

9. The method according to claim 8, wherein the binding information is received over a service operation of a N-Unified Data Management (Nudm) service.

10. The method according to claim 8, wherein the binding information comprises at least:
    UE IP address; and
    a timestamp of a Protocol Data Unit (PDU) session registration.

11. A Unified Data Management (UDM) node in a Service Based Architecture (SBA) telecommunication network, arranged for supporting authentication of a User Equipment UE) in an Internet Protocol (UP) Multimedia Subsystem (IMS) telecommunication network, by interfacing the SBA telecommunication network, the UDM node comprising:
    receive equipment configured to:
      receive, from a Session Management Function (SMF) in the SBA telecommunication network, binding information, the binding information being used to identify the UE in the IMS telecommunication network; and
      receive, from a Home Subscriber Server, in the IMS telecommunication network, a request for providing the binding information; and
    transmit equipment configured to provide, to the HSS in the IMS telecommunication network the binding information.

12. The UDM according to claim 11, wherein the binding information is arranged to be provided over an operation of a N-Unified Data Management (Nudm) service.

13. The UDM according to claim 11, wherein the binding information comprises at least:
    UE IP address; and
    a timestamp of a Protocol Data Unit (PDU) session registration.

14. The UDM according to claim 11, wherein the UDM further comprises select equipment configured to select the binding information to be provided to the HSS based on a timestamp.

15. The UDM according to claim 11, wherein the transmit equipment is further configured to provide, to the SMF, information regarding Data Network Names (DNNs) that will require reporting of a UE IP address to the UDM.

16. The UDM according to claim 11, wherein the transmit equipment is further configured to request, from the SMF, the binding information triggered by the receiving, from the HSS, the request for providing the binding information, and the receive equipment is further configured to receive, by the UDM, the binding information from the SMF.

17. The UDM according to claim 16, wherein the binding information comprises a timestamp indicting a time when the binding information was generated.

18. A Home Subscriber Server (HSS) node in an Internet Protocol (IP) Multimedia Subsystem (IMS) telecommunication network, arranged for supporting authentication of a User Equipment (UE) in the IMS telecommunication network, by interfacing a Service Based Architecture (SBA) telecommunication network, the SBA telecommunication network including a Session Management Function (SMF) that sends binding information to a Unified Data Management (UDM), the HSS node comprising:

transmit equipment configured to send, to the UDM in the SBA telecommunication network, a request for providing the binding information, the binding information being used to identify the UE in the IMS telecommunication network; and receive equipment configured to receive, from the UDM in the SBA telecommunication network, the requested binding information.

19. The HSS node according to claim 18, in the IMS telecommunication network wherein the binding information comprises at least:

UE IP address; and a timestamp of a Protocol Data Unit (PDU) session registration.

\* \* \* \* \*